United States Patent [19]

Scheffler

[11] Patent Number: 5,009,967
[45] Date of Patent: Apr. 23, 1991

[54] FUEL CELL POWER PLANT FUEL CONTROL

[75] Inventor: Glenn W. Scheffler, Tolland, Conn.

[73] Assignee: International Fuel Cells Corporation, South Windsor, Conn.

[21] Appl. No.: 427,223

[22] Filed: Oct. 24, 1989

[51] Int. Cl.$^5$ .......................................... H01M 8/04
[52] U.S. Cl. ........................................ 429/23; 429/24
[58] Field of Search ............................ 429/23, 24, 19

[56] References Cited

U.S. PATENT DOCUMENTS

| | | | |
|---|---|---|---|
| 3,343,991 | 9/1967 | Koenig | 429/23 |
| 3,585,077 | 6/1971 | Waldman | 136/86 |
| 3,745,047 | 7/1973 | Fanciullo et al. | 136/86 |
| 4,046,956 | 9/1977 | Fanciullo | 429/20 |

Primary Examiner—Donald L. Walton
Attorney, Agent, or Firm—Edward L. Kochey, Jr.

[57] ABSTRACT

Fuel cell current is sensed (30) and during a transient, a feed forward demand signal (50) sent to the fuel flow regulator (58). A nominal desired reformer temperature is established for the new fuel cell current. This desired temperature signal (62) is dynamically compensated (64) to establish the operating temperature set point (72). A predominantly lead compensation (66) is achieved for a desired temperature increase and a predominantly lag compensation (68) for a desired temperature decrease. Increased reliance on the temperature as a result of the system input reduces reliance on the accuracy of fuel flow measurement and on the consistency of fuel heating value.

4 Claims, 2 Drawing Sheets

FUEL CELL POWER PLANT FUEL CONTROL

DESCRIPTION

1. Technical Field

The invention relates to the control of fuel for fuel cell power plants and in particular to the avoidance of fuel cell hydrogen starvation.

2. Background of the Invention

A fuel cell is a device which directly converts chemical energy into electrical energy. In a fuel cell fuel and oxygen are supplied to spaced electrodes where the release and acceptance of electrons occurs. An ion transfer electrolyte capable of conducting an electrical charge separates the electrodes.

With an open external circuit the charges accumulate within the fuel cell. When the circuit is closed, the reaction occurs at a rate sufficient to supply whatever current is drawn from the external circuit. It is evident that fuel and oxidant must be supplied to the respective electrodes so that current can be continually supplied to the load in the external circuit. In fact it is essential that fuel be immediately supplied commensurate with any current flow since depletion of hydrogen would otherwise occur at the electrode resulting in serious and permanent damage to the electrode.

A fuel cell power plant uses a fuel cell stack comprised of a plurality of fuel cells electrically connected in series. They must use inexpensive fuel to produce economic power on a large scale. Accordingly, it is known to use natural gas which is steam reformed to produce increased molecular hydrogen in a reformer outside the fuel cells.

Incoming fuel will pass to this reformer with steam being added to provide additional hydrogen, and the incoming fuel heated in the presence of a catalyst to increase the molecular hydrogen. Usually the fuel is heated in the presence of a catalyst in the first portion of a bayonet tube reaching substantially peak temperature at the outlet of this catalytic bed. The fuel then passes down through the bayonet tube in heat exchange relationship with the fuel being heated to recover a portion of the heat and to cool the outgoing fuel. This is followed by a shift converter in which the CO is combined with the $H_2O$ to produce $CO_2$ and additional $H_2$.

This reformed fuel then passes to and through the fuel cell where the chemical reaction removes a portion of the hydrogen. The effluent from the fuel cell containing the excess hydrogen is conducted to the reformer where it is burned forming combustion gases which pass in heat exchange relationship with the fuel being reformed.

With a given load or current draw on the fuel cell it can be appreciated that a range of fuel flows may be passed through the system. A relatively high fuel flow results in a substantial surplus of hydrogen leaving the fuel cell (or a low hydrogen utilization factor) with this large amount of hydrogen passing to the burner firing the reformer. This results in a relatively high reformer temperature with high conversion efficiency, but with a low overall plant efficiency because of the excess amounts of hydrogen being burned rather than being used for the direct conversion to electricity.

A low fuel flow for the same current results in a high utilization factor within the fuel cell and a low amount of hydrogen leaving the fuel cell. This results in a low reformer temperature, producing a relatively low fuel conversion. More critically, however, this results in a hydrogen starvation condition within the electrodes of the fuel cell which cannot be tolerated because of the immediate and permanent damage caused.

In selecting the particular operating condition it is usually taken that a fuel utilization factor of 90-95 percent is the highest hydrogen utilization which can be tolerated even during transients. With the overall utilization at 95 percent, some portions of the fuel cell may well be approaching starvation. An economical and acceptable safe operating condition is that of 80-85 percent utilization. Accordingly, it is desired to select the fuel flow for a steady state operation which results in approximately 80 percent fuel utilization.

As a power plant traverses its operating range the reformer temperature which is correlated to this desirable utilization factor varies. Accordingly, the control system as it operates through a transient must deal not only with the change in load, but the change in heat storage required to achieve the new operating condition.

It is known to use an immediate feed forward signal for controlling the amount of fuel in response to a sensed current signal which is a measurement of the load on the fuel cell. In addition to this immediate fuel flow change signals are sent to adjust the fuel flow to achieve the new desired operating temperature. It has been found that the fuel control system itself in attempting to achieve this temperature modification will result in starvation of the fuel cell during transients. Prior art systems in order to guard against such situation have required maximum/minimum limit schedules interposed in the control systems.

SUMMARY OF THE INVENTION

A fuel cell power plant has a conventional fuel supply, reformer, and fuel cell stack with the exhaust from the fuel cell returning with its excess hydrogen to the reformer. It is then burnt as a heat source for the reformer. Current is sensed to determine the electrical load on the fuel cell and temperature of the reformer fuel is also sensed. The feed forward signal from the sensed current establishes a nominal desired fuel flow signal immediately with any change in the current.

A function generator establishes a nominal desired reformer temperature set point as a function of the sensed current. A dynamic compensator modifies this desired temperature set point to obtain a transient temperature set point. This compensator includes two lead/lag compensators, one of which is set to generate a predominant lead characteristic and the other to establish a predominant lag characteristic. These lead/lag compensators are arranged in parallel with their signal passing to a high select component. This selects the higher of the two lead/lag signals as a modified temperature set point.

This is compared to the actual sensed temperature and an error signal is established which is unity with no error. The feed forward signal to the fuel flow from the current sensor is modified by multiplication with the temperature error signal to establish a transient desired flow set point. A conventional tight control loop measures and modulates the fuel flow to establish the desired set point flow. Excessive decreases in fuel flow are thereby avoided.

DESCRIPTION OF THE PREFERRED EMBODIMENT

Figure 1:
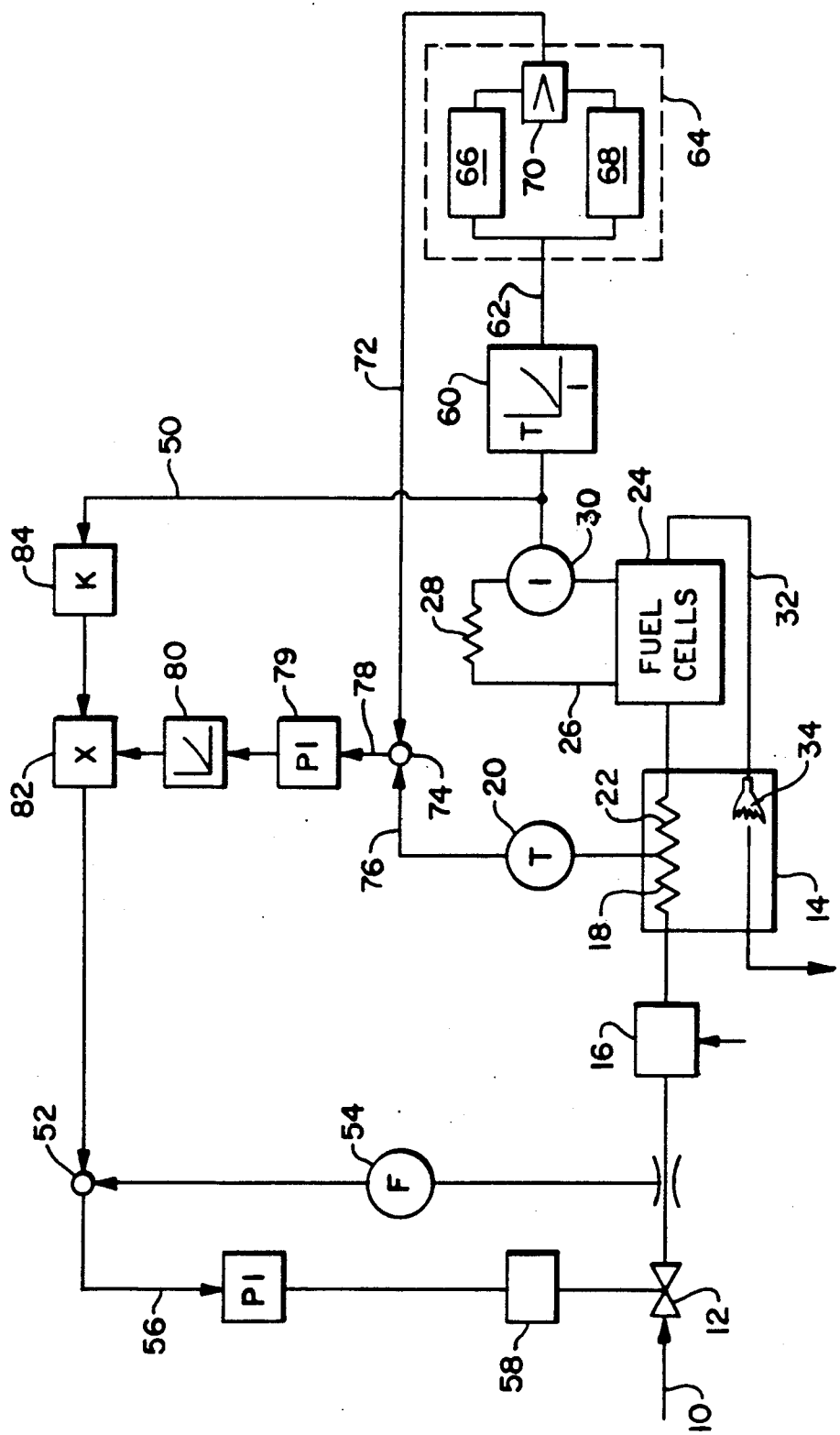
FIG. 1 is a schematic of a fuel cell power plant and the control arrangement.

Incoming fuel 10 passes through fuel control valve 12 to reformer 14. Steam mixer 16 adds a proportional amount of steam to the steam entering the reformer.

Within the reformer 14 fuel is heated in the presence of catalyst within reformer tubes 18 to a midpoint temperature approximating its peak which is measured by temperature sensor 20. It thereafter passes through regeneration tubes 22, usually concentrically within tubes 18 to aid in heating of the incoming fuel and cooling the exiting fuel.

From the reformer the fuel passes through a shift convertor, not shown, and then to fuel cell stack 24 where the chemical energy is directly converted to electricity. The electricity passes through external circuit 26 including load 28 with this load being measured by current sensor 30.

The effluent from the fuel cell containing the excess hydrogen passes through conduit 32 to reformer 14. Here in burner 34 hot gas is formed passing in heat exchange relationship with the tubes 18.

Figure 2:
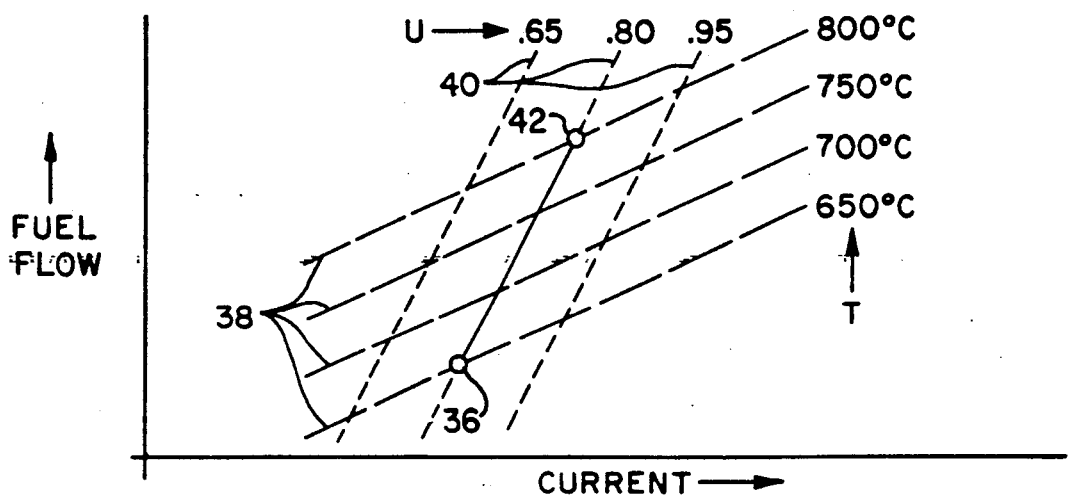
FIG. 2 is a curve showing the system characteristics.

FIG. 2 illustrates the characteristics of this system to be controlled. A point, such as 36, represents a particular current flow and fuel flow. The constant temperature lines 38 show a temperature of 650° C. for this condition. Basically with the indicated fuel flow and the removal of a certain amount of hydrogen by the designated current flow, sufficient hydrogen results which when burned in a reformer produce a temperature of 650° C. at the temperature sensing point. This represents a hydrogen utilization of about 80 percent as indicated by hydrogen utilization curves 40.

Point 42 represents a higher load and a higher fuel flow, but again operation on the 80 percent utilization curve. This yields reformer temperature of 800° C.

At either of these points increasing the fuel flow for the same current withdrawal results in an increasing reformer temperature and a decreasing fuel utilization. Such overflow therefore uses more fuel than is necessary and represents a decrease in overall plant efficiency. While this is not desirable for the long term it is quite acceptable during transients.

A decrease in fuel flow at a given current results in a decreasing reformer temperature. This results in a decreased conversion of fuel in the reformer, but this is not particularly serious. What is serious, however, is the increased fuel utilization occurring and the concomitant tendency toward starvation of the fuel cell electrodes. It is extremely important therefore to avoid flow deficiencies for a particular load, particularly any below the 95% utilization curve.

While the system is capable of operating throughout a wide range on the illustrated curve, the selected and desirable line of operation is that along the line connecting the points 36 and 42.

It should be noted that in passing from point 36 to point 42 the fuel is to be increased as shown on the curve. Since the reformer temperature must also increase from 650° to 800° C., some over firing is required to supply the heat storage.

On the other hand in passing from point 42 to point 36 a decrease in fuel flow as illustrated on the curve is required. Since the reformer temperature is to be decreased, it is required that there be a further deficiency in flow to permit the decrease in temperature of the reformer. It is this further decrease in flow that has been found to be dangerous in the potential production of hydrogen starvation within the cell.

Referring to FIG. 1 the current sensed signal is passed through line 50 to a fuel flow summation point 52. This provides an immediate feed forward flow demand which is compared at set point 52 with the sensed flow 54. An error signal passing through line 56 operates actuator 58 to modulate the valve or fuel flow control means 12. Accordingly a tight control loop is supplied which rapidly brings a fuel flow to the fuel flow set point position.

The current sensed signal from current sensor 30 also passes to a first function generator 60. This function generator establishes the nominal temperature set point which would ultimately be desired for operation at the sensed current load. This nominal desired temperature set point passes through line 62 to dynamic compensators 64.

The signal passes in parallel through a first lead/lag compensator 66 and a second lead/lag compensator 68. The first lead/lag compensator is set to have substantial lead action while the second lead/lag compensator is set to have substantial lag action. The output from the two compensators is passed to high select component 70 which passes the higher of the two signals through line 72 to temperature error means 74. The modified set point temperature here is compared to the actual sensed temperature signal through line 76 resulting in an error signal passing through line 78. Proportional and integral action is applied to this error signal by signal conditioner 79.

This error signal is modified by conversion apparatus 80 to provide a signal of unity with a zero error. It is accordingly applied in multiplier 82 as a modifier for the feed forward signal to the flow control. This supplies the correction to return the reformer temperature to the desired design value.

Multiplier 84 in the feed forward line will be used for appropriate conversion of the current sensed signal to the level desired for the fuel control. Also in the event of a consistent error in the fuel flow measurement or a consistent variation in the estimation of heating value, the temperature conversion loop would continue to maintain an offset that is other than unity. At such steady state operation multiplier 84 may be modified to remove such offset.

Figure 3:
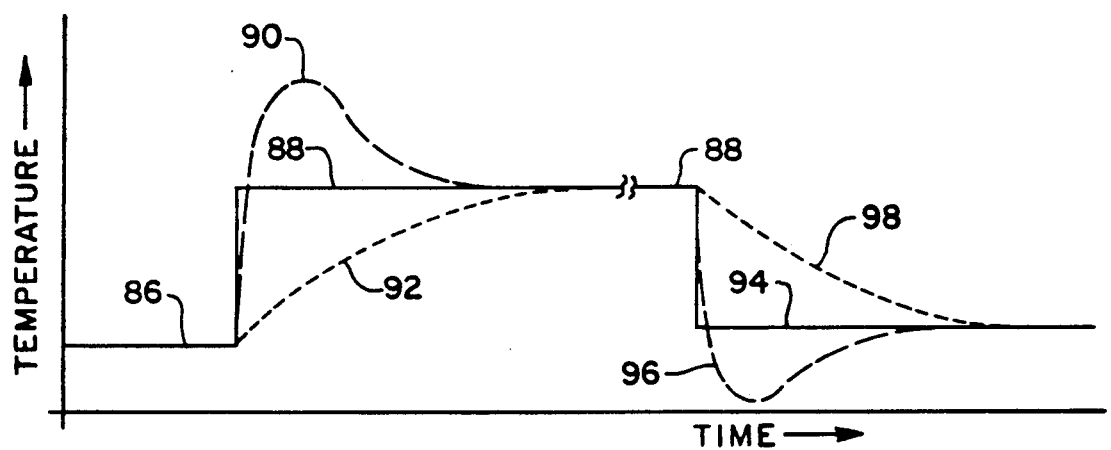
FIG. 3 is a plot versus time of the nominal temperature set point and the modifications made by each lead/lag compensator.
Figure 4:
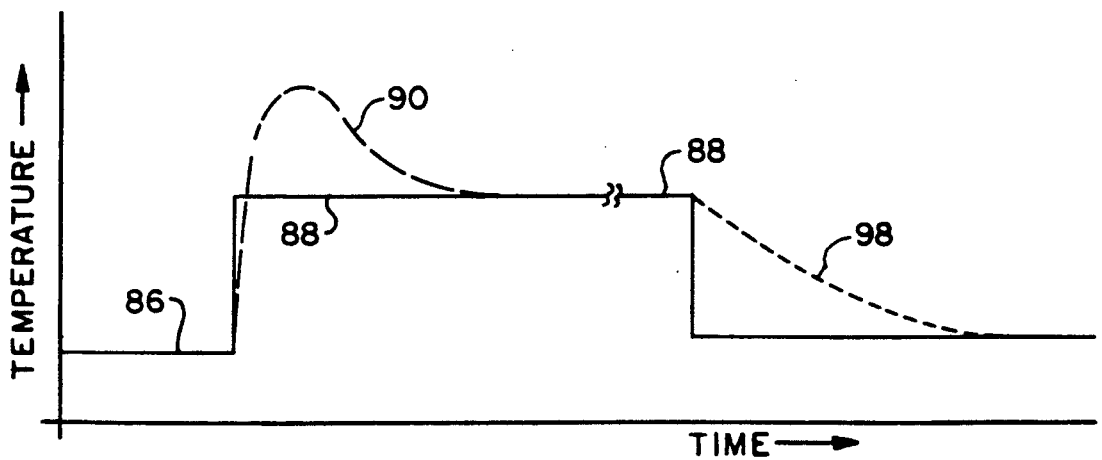
FIG. 4 is a plot versus time of the nominal temperature set point and the selected control signal.

Referring to FIGS. 3 and 4 the operation of the dynamic compensator 64 is illustrated. An initial nominal temperature set point 86 is indicated. As current suddenly increases, there is a step change to temperature 88 as the new nominal set point temperature. Lead/lag compensator 66 set for substantial lead action produces an output modified signal 90 while lead/lag compensation 68 produces an output signal indicated by line 92. During a later downward transient the nominal temperature set point changes from the value at 88 to that of 94. The output of lead/lag compensator 66 produces the signal indicated by 96 while lead/lag compensator 68 produces the signal indicated by line 98.

The high select apparatus 70 operating on these two signals produces the curve of FIG. 4 where the output through line 72 is initially that indicated by 86, thereafter the line 90, 88 and 98.

The enhanced utilization of the temperature measurement as described above reduces reliance on the actual flow measurement. Transient errors induced by flow meter error or variations in fuel heating value are reduced, since the control has increased forces on the result of the inputs.

I claim:

1. In a fuel cell power plant having, fuel supply means for supplying a flow of fuel, a reformer receiving and reforming said flow of fuel, a fuel stack receiving fuel from said reformer, a conduit for conveying fuel cell exhaust containing excess hydrogen to said reformer, a burner for burning said exhaust and said reformer in heat exchange relationship with the fuel supply passing through said reformer; a control system comprising:

a current sensor for sensing the electrical load on said fuel cell stack and establishing a current sensed signal;

a fuel flow summation point;

means for conducting said current sensed signal to said fuel flow summation point as a nominal desired fuel flow signal;

a temperature sensor for sensing the temperature of the reformed fuel at said reformer and establishing a temperature sensed signal;

a first function generator for setting a nominal desired reformer fuel temperature set point representing the steady state desired temperature as a function of the sensed current;

a dynamic compensator for modifying said desired reformer fuel temperature set point to obtain a transient temperature set point comprising, a first lead/lag compensator, a second lead/lag, compensator, one of said lead/lag compensators generating a predominantly lead characteristic signal and the other generating a predominantly lag characteristic signal, and a high select component for selecting and passing the higher signal of said lead characteristic signal and said lag characteristic signal;

error means for comparing said higher signal with said sensed temperature signal and establishing a temperature error signal;

means for modifying said nominal desired fuel flow signal as a function of by said temperature error signal and establishing a transient desired fuel flow set point signal to said fuel flow summation point;

fuel flow sensing means for establishing a fuel flow sensed signal;

means for conveying said fuel flow sensed signal to said fuel flow summation point and establishing a fuel flow error signal; and fuel flow control means responsive to said fuel flow error signal for controlling said fuel flow.

2. A control system as in claim 1:

conversion means for providing a converted signal of unity for a temperature error of zero; and said means for modifying said nominal desired fuel flow signal comprising multiplication means for multiplying said nominal desired fuel flow signal by said converted signal.

3. A control system as in claim 2:

said means for conducting said current sensed signal to said fuel flow summation point being free of proportional or integral action.

4. A control system as in claim 3:

a signal conditioner for applying proportional and integral action to said temperature error signal.

* * * * *